Sept. 18, 1962  A. D. PALMER  3,054,195
TEACHING DEVICE
Filed March 14, 1961
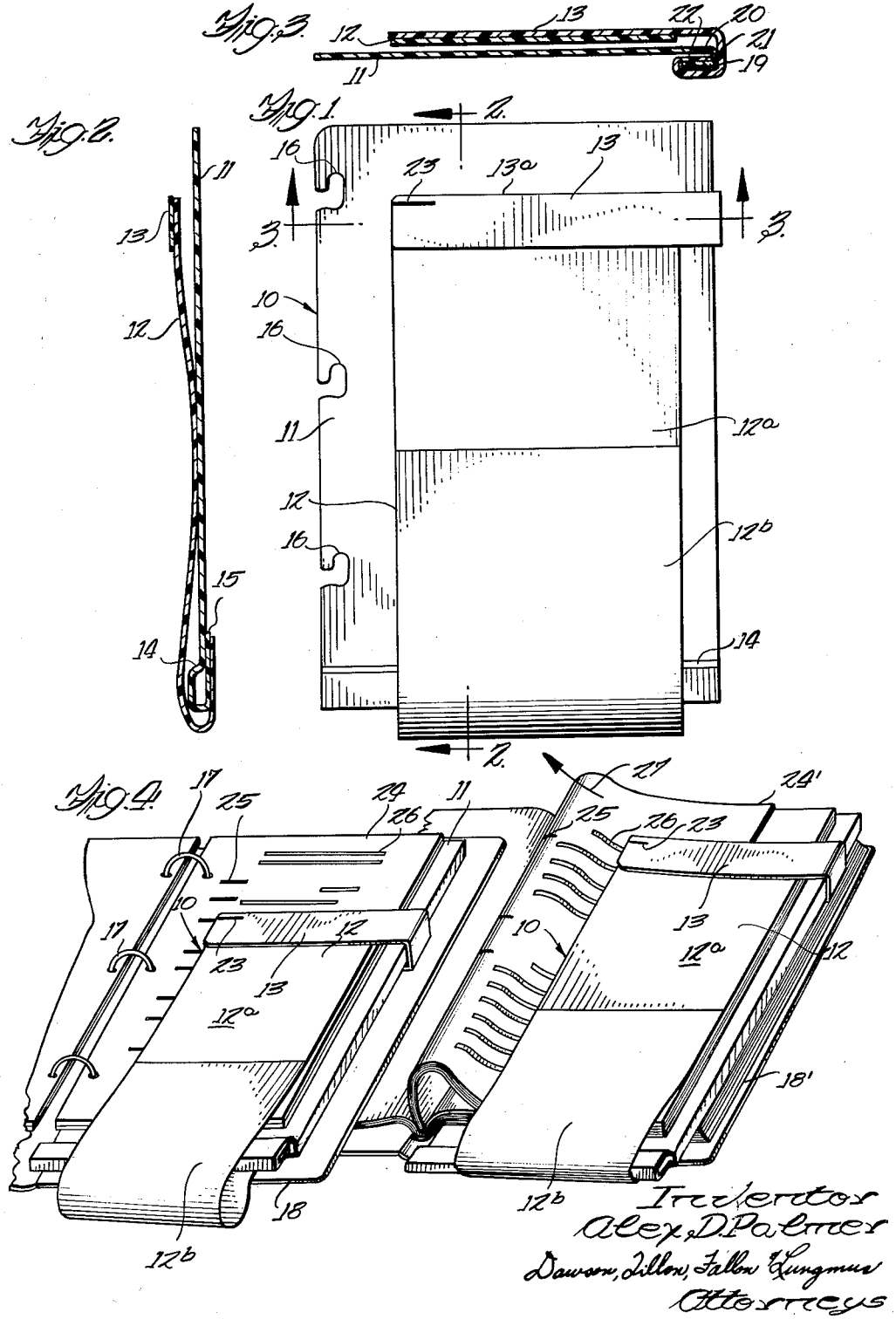
Inventor
Alex D. Palmer
Dawson, Tilton, Fallon Lungmus
Attorneys

United States Patent Office 3,054,195
Patented Sept. 18, 1962

3,054,195
TEACHING DEVICE
Alex D. Palmer, Chicago, Ill.
(915 Dempster, Evanston, Ill.)
Filed Mar. 14, 1961, Ser. No. 95,669
10 Claims. (Cl. 35—9)

This invention relates to a teaching device, and more specifically, to a device particularly adapted for use with printed self-instruction sheets.

Devices which may be manipulated by a user to present printed questions and answers for his own enlightenment are now commonly known as teaching machines or devices and have received increasingly wide spread recognition as valuable educational aids. Such a device may be operated at a pace most suitable for any given individual's learning capabilities and, when properly used, will reinforce the learning process at a time when such reinforcement is considered to be particularly beneficial.

Despite their usefulness, teaching devices and machines are generally both cumbersome and expensive. The high initial cost of acquiring a conventional teaching device would ordinarily be prohibitive for an individual and, even if so acquired, such a device is usually cumbersome and awkward to use and carry about.

Accordingly, it is a principal object of the present invention to provide a teaching device which overcomes the aforementioned defects and disadvantages of present structures. Specifically, it is an object of this invention to provide a teaching device wihich may be retained in a book or notebook and which may be easily and conveniently used in conjunction with the programmed self-instruction sheets of such a book. Another object is to provide a teaching device for extremely simple and inexpensive structure which is particularly suited for use in combination with the programmed self-instruction sheets of a permanently-bound or loose-leaf book. A further object is to provide a teaching device which is suitable for use in conjunction with permanently or loosely bound programmed self-instruction sheets and which may be readily manipulated by a user while it is retained in a book having its lower edge resting upon the user's lap or upon some suitable support surface. Other objects will appear from the specification and drawings in which:

FIGURE 1 is a top plan view of a teaching device embodying the present invention;

FIGURE 2 is a longitudinal vertical sectional view taken along line 2—2 of FIGURE 1;

FIGURE 3 is a cross sectional view taken along line 3—3 of FIGURE 1;

FIGURE 4 is a broken composite view illustrating two variations of use of a teaching device embodying this invention.

In the embodiment of the invention illustrated in the drawings, the numeral 10 generally designates a teaching device essentially comprising a backing sheet 11, a front cover or mask 12 and a mask support element 13.

The backing 11 consists of a generally flat sheet of relatively stiff material. While I prefer a stiff plastic such as polystyrene, it will be understood that other plastic materials as well as other materials such as metal and bored materials might also be used. Near its bottom edge, the backing extends upwardly to provide a transverse shoulder 14 and then continues downwardly, backwardly and upwardly as shown in FIGURE 2. Preferably, the upstanding end portion along the bottom of the backing sheet is fused or otherwise permanently secured to the back surface of the sheet at 15.

The backing sheet is generally rectangular in shape and is provided along its left edge with a plurality of spaced L-shaped slots or notches 16. These slots are spaced to receive the ring fasteners 17 of a conventional ring binder 18 of the type indicated in FIGURE 4. It is believed evident that the L-shape of the slots prevents detachment of the backing from the rings unless the backing is urged upwardly before it is drawn outwardly or laterally. At the same time, the shape of the slots permits the backing to be readily disconnected from the rings of a notebook without first opening such rings.

Referring now to FIGURE 3, it will be observed that the straight right side portion of the backing turns downwardly and then inwardly, thereby providing a reversely-turned back portion 19 spaced from the parallel main portion of the backing sheet to define a channel 20 therebetween. The width of the back edge portion 19 and the width and depth of channel 20 are substantially uniform along the entire longitudinal extent of the backing sheet.

The mask or cover 12 is formed from a rectangular sheet of highly flexible and non-transparent material. A thin sheet of flexible plastic such as polyglycol terephthalate has been found particularly effective although other plastics and plastic-impregnated fabrics may be used. If desired, the upper portion 12a of the mask may be externally covered with a protective plastic film which, in addition to improving the wearing characteristics of the mask, tends to make the upper portion slightly stiffer than the lower portion 12b and thereby localize the folding action of the mask in the lower portion.

The lower end portion of the mask turns upwardly about the lower end of the backing and is permanently secured by adhesive or by any other suitable means to the back surface of that backing. The longitudinal dimensions of the mask along the front face of the backing sheet are less than the longitudinal dimensions of that sheet, as shown in FIGURES 1 and 2. It will also be observed that the width of the mask is substantially less than the width of the backing sheet and that the snap-ring openings 16 are fully exposed along the left margin of the backing sheet whether the mask is raised or lowered.

The mask-supporting element comprises a strip of flexible plastic or other material which extends transversely over the front face of the backing sheet and which is turned about the right edge of that sheet. Referring to FIGURE 3, it will be seen that the opposing surfaces of the support element 13 and backing sheet 11 are spaced substantially apart along parallel planes. The hook portion 21 which extends about the right edge of the backing sheet terminates in a laterally turned tongue portion 22. Tongue 22 is slidably received within channel 20 and has a width substantially the same as the width (or depth) of the channel. The back portion 19 of the backing sheet is slidably embraced by the hook portion of the mask-supporting element 13 so that the upper edge 13a of the element it at all times maintained at right angles to the right edge of the backing sheet.

The free end of the mask-supporting element terminates adjacent the left edge of the mask and, as shown in FIGURE 1, the element is provided with a transverse indicia marking or line 23 extending inwardly from the element's left edge. The top portion of mask 12 is permanently secured by adhesive or by any other appropriate means to the undersurface of mask-supporting element 13 (FIGURES 2 and 3).

In operation of the device, one or more program sheets 24 or 24' (FIGURE 4) are inserted between the raised mask and the front surface of the backing sheet so that the bottom edges of the program sheets are spaced slightly above shoulder 14. With the exception of marginal reference marks 25 along the left side of the uppermost program sheet, all of the imprinted material 26 upon that sheet will thus be concealed by the mask. The user then slides the mask-supporting element downwardly with reference to the backing sheet 11 until indicia marking 23 is in alignment with the uppermost reference line of the program sheet, thereby exposing a printed question on the program sheet directly above the upper edge 13a of the mask-supporting element. The answer to the question, concealed by the mask, is exposed by urging the mask-supporting element downwardly until its mark 23 is in alignment with the next reference line of the series. This procedure is continued until the mask-supporting element bears against stop 14 and is restrained from further downward movement. The user then raises the mask and turns the page as indicated by the arrow 27 in FIGURE 4.

The turning or removal of a page from beneath mask 12 is greatly facilitated by the flexibility of the transversely-extending mask-supporting element 13. In the right portion of FIGURE 4, it will be observed that the free end portion of the mask-supporting element is bent upwardly to permit unrestricted movement of the uppermost page from beneath the mask.

Since at least the lower portion 12b of the mask 12 may be easily folded, a book in which the device 10 is inserted may be rested upon its lower edge without impairing operation of the device. In other words, the limp mask is incapable of preventing downward movement of the mask-supporting element 13 even though the folded lower portion of the mask should engage some obstruction during the lowering operation.

As already described and as shown in FIGURE 4, the lower edges of the program sheets disposed between the mask 12 and backing 11 are spaced slightly above shoulder 14. Since further downward movement of the element 13 is prevented when the lower edge thereof engages the shoulder, it is believed apparent that even when the mask is fully lowered the upper edge of the element 13 will be disposed beneath the lowest line of printed material on the exposed program sheet without dropping beneath the lower edges of the stack of sheets. As a result, all of the material imprinted on the sheets may be examined by a user without inadvertent release of the sheets from between the mask 12 and backing 11.

FIGURE 4 illustrates the use of the device 10 in conjunction with printed program sheets releasably retained in a loose-leaf binder 18 and with program sheets permanently bound in a book 18'. It is to be understood, of course, that the program sheets need not be either releasably or permanently bound to permit use of the teaching device of the present invention but that one or more free sheets may be inserted between the backing 11 and mask 12 as desired.

While in the foregoing I have disclosed an embodiment of the invention in considerable detail for purposes of illustration it will be understood by those skilled in the art that many of these details may be varied without departing from the spirit and scope of the invention.

I claim:

1. A teaching device for use with printed self-instruction sheets, comprising a stiff backing sheet, a foldable masking sheet normally extending over said backing sheet and having its lower edge secured to the lower portion of said backing sheet, and a transversely-elongated mask-supporting element secured to the upper edge of said masking sheet, said element being spaced above and parallel with the upper surface of said backing sheet, said element also having a portion thereof slidably engaging one side edge of said backing sheet for sliding movement into selected positions over said backing sheet between the upper and lower edges thereof, said portion of said element being interlocked with said side edge to prevent transverse movement of said element in all directions across said backing sheet.

2. The structure of claim 1 in which said backing sheet is provided with a transversely-extending shoulder adjacent the lower edge thereof, said shoulder being engagable with said support element for limiting the extent of downward movement thereof.

3. The structure of claim 1 in which said mask-supporting element is longitudinally flexible for flexing movement away from said backing sheet.

4. A teaching device for use with printed self-instruction sheets, comprising a stiff backing sheet, a foldable mask narrower than said backing sheet and normally extending over said sheet, said mask and backing sheet being adapted to receive therebetween a plurality of printed self-instruction sheets having marginal indicia visible along one side of said mask, said mask having its lower edge secured to the lower portion of said backing sheet and having its upper edge movable over said backing sheet and printed self-instruction sheets thereon between a raised position and a lowered position, and means operatively associated with said backing sheet and the upper edge of said mask for guiding movement of the mask's upper edge between said raised and lowered positions and for restraining movement of said upper edge of said mask in all transverse directions across said backing sheet.

5. The structure of claim 4 in which stop means are provided along the lower edge of said backing sheet, said stop means being engagable with said first-mentioned means for limiting the extent of downward movement of the mask's upper edge.

6. The structure of claim 4 in which said means comprises a transversely-elongated mask-supporting element having one end thereof slidably engaging a side edge of said backing sheet for sliding movement of said element into selected positions between the backing sheet's upper and lower edges, said element being secured to the upper edge of said mask and being spaced from said backing sheet.

7. The structure of claim 6 in which said element is longitudinally flexible for bending movement away from said backing sheet during the removal and insertion of printed self-instruction sheets between said backing sheet and said mask.

8. A teaching device for use with printed self-instruction sheets comprising a stiff backing sheet, a foldable mask having its lower edge secured to the bottom of said backing sheet and being movable between a raised position extending over said backing sheet and a lowered position folded below the backing sheet's lower edge, said backing sheet having a straight reversely-turned side edge, and a transversely-elongated element secured to the upper edge of said mask and having one end thereof hooked about the reversely-turned side edge of said backing sheet for sliding movement therealong and for preventing transverse movement of said element and mask across said backing sheet, said element being spaced above the upper surface of said backing sheet for receiving therebetween a plurality of printed self-instruction sheets, whereby, as said element is slid along said straight reversely-turned side edge said mask is raised and lowered to conceal and reveal printed program material upon said self-instruction sheets.

9. The structure of claim 8 in which said element is longitudinally flexible for flexing movement away from the upper surface of said backing sheet.

10. The structure of claim 8 in which said backing sheet is provided with a transversely-extending shoulder along the bottom edge thereof, said shoulder being engageable with said element for limiting the extent of downward movement of the same.

References Cited in the file of this patent

UNITED STATES PATENTS

| 2,662,306 | McMaster | Dec. 15, 1953 |
| 2,782,528 | Wastl | Feb. 26, 1957 |
| 2,986,822 | Balchuns | June 6, 1961 |

FOREIGN PATENTS

| 825,342 | France | Dec. 8, 1937 |